(12) United States Patent
Detloff et al.

(10) Patent No.: US 10,969,242 B2
(45) Date of Patent: Apr. 6, 2021

(54) NAVIGATION SYSTEM AND A VEHICLE INCLUDING THE NAVIGATION SYSTEM

(71) Applicant: The Boeing Company, Chicago, IL (US)

(72) Inventors: Shaun Detloff, Huntington Beach, CA (US); James K. Gingrich, Newark, OH (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 16/582,370

(22) Filed: Sep. 25, 2019

(65) Prior Publication Data

US 2020/0018619 A1 Jan. 16, 2020

Related U.S. Application Data

(63) Continuation of application No. 15/409,707, filed on Jan. 19, 2017, now Pat. No. 10,466,067.

(51) Int. Cl.
*G01C 25/00* (2006.01)
*G01C 19/56* (2012.01)
*G01C 19/5776* (2012.01)

(52) U.S. Cl.
CPC ........... *G01C 25/005* (2013.01); *G01C 19/56* (2013.01); *G01C 19/5776* (2013.01)

(58) Field of Classification Search
CPC ... G01C 25/005; G01C 19/56; G01C 19/5776
See application file for complete search history.

(56) References Cited

U.S. PATENT DOCUMENTS

| 5,905,202 | A | 5/1999 | Kubena et al. | |
|---|---|---|---|---|
| 7,103,477 | B1 | 9/2006 | Lee | |
| 8,800,349 | B2 | 8/2014 | Caron | |
| 2006/0017449 | A1 | 1/2006 | Takekawa et al. | |
| 2009/0064781 | A1* | 3/2009 | Ayazi | G01C 19/5719 73/504.12 |
| 2009/0292497 | A1 | 11/2009 | Lee | |

(Continued)

FOREIGN PATENT DOCUMENTS

| EP | 1995556 | 11/2008 |
|---|---|---|
| JP | 2000074675 | 3/2000 |
| RU | 2509981 | 3/2014 |

OTHER PUBLICATIONS

European Office Action, European Application No. 17203739.2 dated Dec. 9, 2019.

(Continued)

*Primary Examiner* — Raymond L Nimox
(74) *Attorney, Agent, or Firm* — Perman & Green LLP (57) ABSTRACT

A navigation system includes a Coriolis vibratory gyroscope, a voltage input supply, and a controller. The voltage input supply is configured to supply a first voltage input to the Coriolis vibratory gyroscope at a first bias voltage, and supply a second voltage input to the Coriolis vibratory gyroscope at a second bias voltage, the second bias voltage being different than the first bias voltage. The controller is configured to detect a difference in responses of the Coriolis vibratory gyroscope to the first bias voltage and the second bias voltage, and determine a gyro rate of the Coriolis vibratory gyroscope as a function of the difference in responses and a correction term.

20 Claims, 4 Drawing Sheets

(56) References Cited

U.S. PATENT DOCUMENTS

| | | | |
|---|---|---|---|
| 2010/0063763 A1* | 3/2010 | Rozelle | G01C 19/5691 |
| | | | 702/92 |
| 2014/0260611 A1 | 9/2014 | Johari-Galle et al. | |
| 2015/0053001 A1 | 2/2015 | Frey et al. | |
| 2015/0082885 A1 | 3/2015 | Rinkio et al. | |
| 2015/0192415 A1* | 7/2015 | Ge | G01C 19/5684 |
| | | | 73/504.13 |
| 2015/0226557 A1 | 8/2015 | Aaltonen | |
| 2016/0091339 A1* | 3/2016 | Weinberg | G01C 19/5776 |
| | | | 73/1.77 |
| 2016/0109258 A1 | 4/2016 | Boser et al. | |
| 2016/0116301 A1 | 4/2016 | Detloff et al. | |
| 2016/0139179 A1 | 5/2016 | Ku et al. | |

OTHER PUBLICATIONS

Challoner, et al. "Boeing Disc Resonator Gyroscope", IEEE Conference Publications, 2014 IEEE/ION Position, Location and Navigation Symposium—PLANS 2014, pp. 504-514. DOI: 10.1109/PLANS.2014.6851410.

European Search Report, European Application No. 17203739 dated Jun. 7, 2018.

Russian Office Action, Russian Application No. 2017137002/28(064506) dated Dec. 14, 2020.

\* cited by examiner

NAVIGATION SYSTEM AND A VEHICLE INCLUDING THE NAVIGATION SYSTEM

CROSS-REFERENCE TO RELATED APPLICATIONS

This application is a continuation of and claims the benefit of U.S. patent application Ser. No. 15/409,707 filed on Jan. 19, 2017 (now U.S. Pat. No. 10,466,067, issued on Nov. 15, 2019), the disclosure or which is incorporated herein by reference in its entirety.

BACKGROUND

1. Field

The exemplary embodiments generally relate to calibration of Coriolis Vibratory Gyroscopes, and in particular, calibration of Coriolis Vibratory Gyroscopes with dual bias voltage measurements.

2. Brief Description of Related Developments

Gyroscopes have long been in use in many industries, including the aerospace, maritime and defense industries for determining the orientation of a device or machine. In recent years, gyroscopes also found applications in consumer electronics—notably smartphones and global positioning system receivers. One classification of gyroscopes commonly in use today is Coriolis Vibratory Gyroscopes (also known as Coriolis resonating gyroscopes or vibrating structure gyroscopes). Coriolis Vibratory Gyroscopes, unlike their spinning mechanical gyroscope counterparts, are solid state and operate by using a vibrating structure to determine a rate of rotation of the gyroscope. The vibrating structure of Coriolis Vibratory Gyroscopes continues to vibrate in the same plane, even as the orientation of the Coriolis Vibratory Gyroscope is changed due to the force exerted on the Coriolis Vibratory Gyroscope support by the Coriolis effect as the orientation of the Coriolis Vibratory Gyroscope is changed. By measuring the force exerted on the support due to the Coriolis effect, the rate of rotation of the Coriolis Vibratory Gyroscope can be determined, and in turn, the orientation of the Coriolis Vibratory Gyroscope can also be determined.

However, Coriolis Vibratory Gyroscopes can experience drift errors where the instrument scale factor has been corrupted and is no longer capable of giving consistent output. Conventionally, Coriolis Vibratory Gyroscopes experiencing drift errors can be calibrated or re-calibrated with an external reference to correct for the drift and the corrupted scale factors. However, in many situations, no external references are available to recalibrate after the deployment of the Coriolis Vibratory Gyroscope. This is especially true, for example, in missile systems, spacecraft or in other devices or machines that cannot be easily recalled for recalibration once deployed. Conventional calibration techniques are simply not sufficient for these applications.

Historically, for mechanical spinning mass gyroscopes, an alternative method of calibration called "wheel speed modulation" was the subject of experiments. "Wheel speed modulation" was successfully demonstrated to provide azimuth determination in the absence of case rotation and provided ramp bounding to minimize drift errors by several magnitudes. The operation of "wheel speed modulation" is based on different torques being applied to the spinning mass of a mechanical gyroscope produced by mechanisms which are unrelated to the magnitude of the gyroscope angular momentum. By modulating the speed and the momentum of the spinning gyroscope mass, a bias can be determined based on the output of the gyroscope which can be employed to determine the drift of the mechanical gyroscope. When two different torque measurements are solved simultaneously, a bias variation can be determined which is constant. The constant bias variation allows for field-derived values of angular rate input.

However, despite the success of "wheel speed modulation" in the laboratory, this technique may not be practical. In order to accommodate the modulation of the speed of the spinning mass in mechanical gyroscopes, the "wheel speed modulation" method is relatively slow, because it takes time for the differential torque applied to the spinning mass of a mechanical gyroscope to result in the desired wheel speed modulation. There may also be issues with repeatability in modulating the speed of the spinning mass of the mechanical gyroscope, which makes "wheel speed modulation" impractical for widespread deployment.

SUMMARY

In accordance with one or more aspects of the present disclosure, a method including supplying a first voltage input to a Coriolis vibratory gyroscope at a first bias voltage, supplying a second voltage input to the Coriolis vibratory gyroscope at a second bias voltage, the second bias voltage being different than the first bias voltage, detecting a difference in responses of the Coriolis vibratory gyroscope due to the first bias voltage and the second bias voltage, and determining a gyro rate of the Coriolis vibratory gyroscope as a function of the difference in responses and a correction term.

In accordance with one or more aspects of the present disclosure, a system including a Coriolis vibratory gyroscope, a voltage input supply configured to supply a first voltage input to the Coriolis vibratory gyroscope at a first bias voltage, and supply a second voltage input to the Coriolis vibratory gyroscope at a second bias voltage, the second bias voltage being different than the first bias voltage, and a controller configured to detect a difference in responses of the Coriolis vibratory gyroscope due to the first bias voltage and the second bias voltage, and determine a gyro rate of the Coriolis vibratory gyroscope as a function of the difference in responses and a correction term.

In accordance with one or more aspects of the present disclosure, a method including determining scale factors for a first voltage input at a first bias voltage and a second voltage input at a second bias voltage for a Coriolis vibratory gyroscope, providing the first voltage input to the Coriolis vibratory gyroscope at the first bias voltage and detecting a first response of the Coriolis vibratory gyroscope, providing the second voltage input to the Coriolis vibratory gyroscope at the second bias voltage and detecting a second response of the Coriolis vibratory gyroscope, and using a difference of the first response and the second response, the scale factors for the first voltage input and the second voltage input, and a gyro rate of the Coriolis vibratory gyroscope to determine a correction term representing a function of a difference of the time-dependent instrument bias in the first response and the second response.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Figure 1:
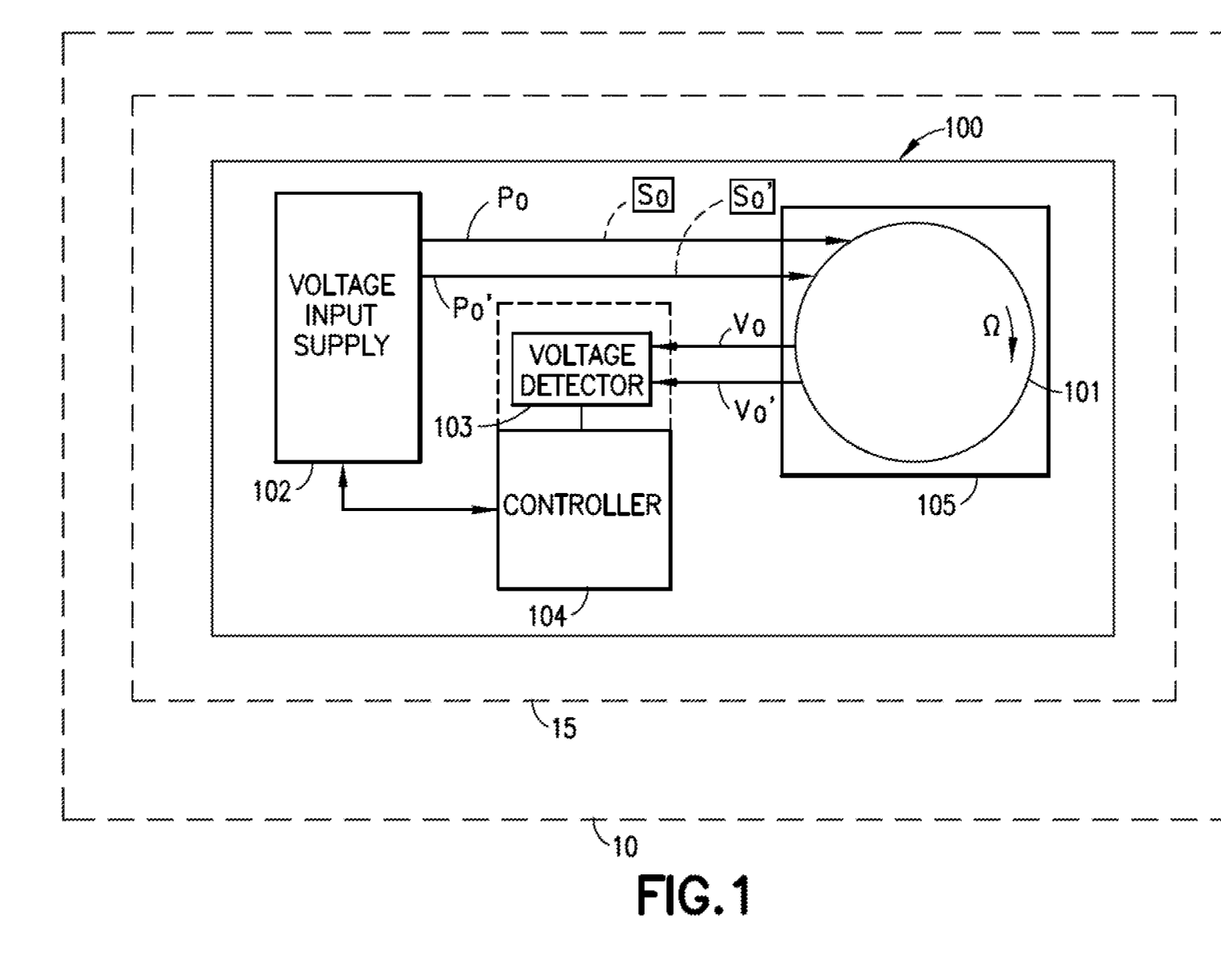
FIG. 1 is a block diagram of a Coriolis Vibratory Gyroscope system in accordance with one or more aspects of the present disclosure.

Referring to FIG. 1, a Coriolis Vibratory Gyroscope (CVG) system 100 is illustrated. Aspects of the present disclosure provide a system for determining a rate of rotation for a Coriolis Vibratory Gyroscope, where the scale factor(s) for the CVG have become corrupted or where gyroscopic drift has occurred, which addresses the deficiencies of conventional gyroscope calibration methods noted above. In one aspect, the CVG system 100 includes a Coriolis Vibratory Gyroscope 101 coupled to a CVG support 105, a voltage input supply 102, a voltage detector 103, and a controller 104. In one aspect, CVG 101 is a hemispherical resonator gyroscope. However, in other aspects, the CVG 101 can include tuning fork gyroscopes, cylindrical vibratory gyroscopes, micro-electromechanical (MEM) gyroscopes, piezo-electric gyroscopes, or any suitable Coriolis Vibratory Gyroscope or solid-state gyroscope which operates on the principle of the Coriolis effect.

In one aspect, the voltage input supply 102 is connected to the CVG 101 and is configured to supply a first voltage to the CVG 101 at a first bias voltage $P_0$ and supply a second voltage input to the CVG 101 at a second bias voltage $P_0'$, where the second bias voltage $P_0'$ is different than the first bias voltage $P_0$. In one aspect, the first bias voltage $P_0$ and second bias voltage $P_0'$ supplied by the voltage input supply 102 each are associated with a different, respective predetermined scale factor $S_0$, $S_0'$ of the CVG 101. In one aspect, for example $P_0' = P_0/S_0'$.

In one aspect, the CVG 101 is configured to output a first response $V_0$ (in the form of a voltage output) in response to the first bias voltage $P_0$ and a second response $V_0'$ (in the form of a different voltage output) in response to the second bias voltage $P_0'$. In one aspect, each of the first response $V_0$ and second response $V_0'$ output by the CVG 101 are detected by the voltage detector 103, which is in communication with the controller 104. In one aspect, the voltage detector 103 is a standalone sensor. However, in other aspects, the voltage detector 103 is a part of the controller 104 (as shown in the dashed lines in FIG. 1). In one aspect, the controller 104 (in conjunction with the voltage detector 103) is configured to detect and determine a difference in the first and second responses $V_0, V_0'$ of the CVG 101 due to the first bias voltage $P_0$ and the second bias voltage $P_0'$ respectively. In one aspect, the difference in the first and second responses $V_0, V_0'$ of the CVG 101 due to the first and second bias voltages $P_0, P_0'$, as determined by the controller 104 (and the voltage detector 103), is represented as a change in voltage output of the CVG 101 from the first response $V_0$ at the first bias voltage $P_0$ to the second response $V_0'$ at the second bias voltage $P_0'$. This change in voltage output of the CVG 101 provides a first scale factor $S_0$ corresponding to the first response $V_0$ and a second scale factor $S_0'$ corresponding to the second response $V_0'$ for a common voltage input to the CVG 101. In one aspect, the difference in the first and second responses $V_0, V_0'$ of the CVG 101 to the first bias voltage $P_0$ and second bias voltage $P_0'$ is constant.

In one aspect, the controller 104 is also configured to determine a gyro rate $\Omega$ of the CVG 101 as a function of the difference in the first and second responses $V_0, V_0'$ as well as a correction term C. The gyro rate $\Omega$ of the CVG 101 is a rate of rotation of the CVG 101 and is independent of the scale factors $S_0$, $S_0'$ of the CVG 101 at the first bias voltage $P_0$ and second bias voltage $P_0'$. The correction term C is a predetermined constant value based on the first and second responses $V_0$ and $V_0'$ and initial input rate of the CVG 101 at the first bias voltage $P_0$ and the second bias voltage $P_0'$.

In one aspect, during the operation of the CVG 101, a bias of the CVG 101 (e.g., a non-zero gyro rate $\Omega$ when an input inertial rate is zero) and the first and second scale factors $S_0$, $S_0'$ may drift due to a number of factors, including extended use of the CVG 101, temperature or environmental changes or other factors. In one aspect, the controller 104 is configured to determine the gyro rate $\Omega$ and the correction term C of the CVG 101 independently of the drift imparted on the first and second scale factors $S_0$, $S_0'$ and the bias of the CVG 101. In one aspect, the controller 104 is configured to determine the gyro rate and the correction term C by a model to be derived below.

In one aspect, consider the IEEE standard 1431-2004 model for the closed loop scale factor for Coriolis Vibratory Gyroscopes, represented as:

$$SV = [\omega + D][1 + 10^{-6}\varepsilon_k]^{-1} \qquad \text{EQ1:}$$

Where S is a scale factor (e.g., scale factors $S_0$ and $S_0'$) for a voltage output, V is the voltage output (e.g., the first and second responses $V_0$, $V_0'$) in volts, D is the drift rate (°/h), $\varepsilon_k$ is the scale factor error (ppm) and $\omega$ is the inertial input (°/h).

In one aspect, EQ1 can be generalized as:

$$V = \Omega + Df \quad \text{EQ 2:}$$

Where Df represents the instrument bias of the CVG 101 at, for example, a predetermined voltage output V in response to, for example, a predetermined bias voltage P. In one aspect, EQ2 is analogous to the model for mechanical gyroscopes:

$$T = H*\Omega + Df \quad \text{EQ3:}$$

where T represents torque.

In one aspect, when the first and second bias voltages $P_0$, $P_0'$ are applied to the CVG 101, the resulting first and second responses $V_0, V_0'$ of the CVG 101 to the first and second bias voltages $P_0, P_0'$ can be represented as two different equations EQ4 and EQ5 which are based on EQ2, described above.

$$V_0 = \Omega + Df \quad \text{EQ4:}$$

$$V_0' = \Omega + D\acute{f} \quad \text{EQ5:}$$

Where Df represents the instrument bias of the CVG 101 at the first response $V_0$ in response to the first bias voltage $P_0$ and $D\acute{f}$ represents the instrument bias at the second response $V_0'$ in response to the second bias voltage $P_0'$ and where the correction term C can be defined as:

$$Df - D\acute{f} = C \quad \text{EQ6:}$$

The correction term C, as described in EQ6, is a constant that is field or factory calibrated. When EQ4 and EQ5 are solved together for the gyro rate $\Omega$, given EQ6, equations EQ7 and EQ8 are derived, which enables the controller 104 to determine the gyro rate $\Omega$ for the CVG 101:

$$\Omega = (V_0 - V_0' - C)/2 \quad \text{EQ7:}$$

Where $(V_0 - V_0' - C)$ is divided by 2 for half scale factor change.

The more general form of EQ7 can be expressed as EQ8:

$$\Omega = \frac{(V_0 - V_0' - C)}{\frac{1}{S_0} - \frac{1}{S_0'}} \quad \text{EQ8}$$

where the change in scale factor is a constant and where $S_0$ is the first scale factor and $S_0'$ is the second scale factor, $V_0$ is the first response at the first bias voltage $P_0$, $V_0'$ is the second response at the second bias voltage $P_0'$, and C is the correction term. In one aspect, the difference between the first and second responses $V_0, V_0'$ of the CVG 101 to the first bias voltage and second bias voltage $P_0, P_0'$ is constant. In one aspect, by applying EQ8 given the first and second responses $V_0, V_0'$ of the CVG 101 to the first and second bias voltages $P_0, P_0'$ and given the first and second scale factors $S_0, S_0'$, the controller 104 can determine the gyro rate $\Omega$ of the CVG 101 independently of calibration of the first scale factor $S_0$ and the calibration of the second scale factor $S_0'$ where the time dependent instrument bias of the CVG 101 caused the first scale factor $S_0$ and the second scale factor $S_0'$ to shift equally.

In one aspect, the following example is provided for exemplary purposes only to show that the gyro rate $\Omega$ can be obtained independently of the calibration of the first scale factor $S_0$ and the calibration of the second scale factor $S_0'$ and the time dependent instrument bias of the CVG 101. All numbers and figures presented below are for exemplary purposes only.

Assuming that there is a first and a second bias voltage $P_0$ and $P_0'$ given an input gyro rate $\Omega$, where $$P_0 = \frac{\Omega}{S_0}, P_0' = \frac{\Omega}{S_0'},$$

and the first and second bias voltage $P_0$ and $P_0'$ respectively have a first scale factor $S_0$ of, e.g., $$1\frac{v}{rad/sec}$$

and a second scale factor $S_0'$ of, e.g., $$0.4\frac{v}{rad/sec},$$

where the input gyro rate $\Omega$ is, for example, $$160\frac{rad}{sec}$$

(which is the anticipated pulse rate output or output gyro rate $\Omega'$ of the CVG 101), $P_0$ is, for example, 160/1 and $P_0'$ is, for example, 160/0.4. As such, $P_0*S_0 = 160$ and $P_0'*S_0' = 160$. If the first bias voltage $P_0$ and second bias voltage $P_0'$ are multiplied with their respective scale factors $S_0, S_0'$, the anticipated gyro rate $\Omega$ is $$160\frac{rad}{sec}$$

for both.

$$P_0*S_0 = (160/1)*1 = 160$$

$$P_0'*S_0' = (160/0.4)*0.4 = 160$$

If time dependent instrument bias $B_0$ and $B_0'$ are introduced into the calculation, then the measured voltage output $M_1, M_2$ corresponding to the first response $V_0$ and second response $V_0'$ respectively will no longer equal 160.

Given an exemplary first instrument bias $$B_0 = 5\frac{rad}{sec}$$

and an exemplary second instrument bias $$B_0' = 3\frac{rad}{sec}:$$

$$M_1 = (P_0 + B_0)*S_0 = 165$$

$$M_2 = (P_0' + B_0')*S_0' = 161.2$$

Knowing EQ4 and EQ5 and given EQ6, shown above, the first and second voltage responses $V_0$ and $V_0'$ can be represented as:

$$V_0 = P_0 + B_0 = 165$$

$$V_0' = P_0' + B_0' = 403$$

By applying the first and second voltage responses $V_0$, $V_0'$ to EQ6, the correction term C can be derived.

$$C = B_0 - B_0' = 2$$

By applying the exemplary values of the first and second voltage responses $V_0$, $V_0'$ and the scale factors $S_0$, $S_0'$ and the correction term, the output gyro rate $\Omega'$ can be determined by the controller 104:

$$\Omega' = \frac{(V_0 - V_0' - C)}{\frac{1}{S_0} - \frac{1}{S_0'}}$$

Or:

$$\Omega' = \frac{(165 - 403 - 2)}{\frac{1}{1} - \frac{1}{.4}} = 160 \frac{\text{rad}}{\text{sec}}$$

Thus, the output gyro rate $\Omega'$ is the same as the input gyro rate $\Omega$, and can be determined from EQ8 independently of the calibration of the first scale factor $S_0$, the calibration of the second scale factor $S_0'$ and the time dependent instrument bias (e.g. $B_0$, $B_0'$) of the CVG 101.

In another aspect, another example is provided for exemplary purposes below. All numbers and figures presented below are for exemplary purposes only.

Assuming that there is a first and a second bias voltage $P_0$ and $P_0'$ given an input gyro rate $\Omega$ of $$100 \frac{\text{rad}}{\text{sec}},$$

where $$P_0 = \frac{\Omega}{S_0}, P_0' = \frac{\Omega}{S_0'},$$

and the first and second bias voltage $P_0$ and $P_0'$ respectively have a first scale factor $S_0$ of, e.g., $$1.5 \frac{v}{\text{rad/sec}}$$

and a second scale factor $S_0'$ of, e.g., $$3 \frac{v}{\text{rad/sec}},$$

$P_0$ is, for example, 100/1.5 (or about 66.667) and $P_0'$ is, for example, 100/3 (or about 33.333). If the first bias voltage $P_0$ and second bias voltage $P_0'$ are multiplied with their respective scale factors $S_0$, $S_0'$ as described above, the anticipated gyro rate $\Omega$ is $$100 \frac{\text{rad}}{\text{sec}}$$

for both.

When an exemplary first and second instrument bias are provided, such as a bias $B_0$ of $$.9 \frac{\text{rad}}{\text{sec}}$$

for the first bias voltage $P_0$ and a bias $B_0'$ for the second bias voltage $P_0'$ are introduced, we can calculate the first and second voltage responses $V_0$ and $V_0'$ as:

$$V_0 = P_0 + B_0 = 66.667 + 0.9 = 67.567$$

$$V_0' = P_0' + B_0' = 33.333 + 1.1 = 34.433$$

By applying the first and second voltage responses $V_0$, $V_0'$ to EQ6, the correction term C can be derived.

$$C = B0 - B0' = 0.9 - 1.1 = -0.2$$

By applying the exemplary values of the first and second voltage responses $V_0$, $V_0'$, the scale factors $S_0$, $S_0'$ and the correction term, an output gyro rate $\Omega'$ can be determined by the controller 104:

$$\Omega' = \frac{(V_0 - V_0' - C)}{\frac{1}{S_0} - \frac{1}{S_0'}}$$

Or:

$$\Omega' = \frac{(67.567 - 34.433 + 0.2)}{\frac{1}{1.5} - \frac{1}{3}} = 100 \frac{\text{rad}}{\text{sec}}$$

Again, the output gyro rate $\Omega'$ is the same as the input gyro rate $\Omega$, and can be determined from EQ8 independently of the calibration of the first scale factor $S_0$, the calibration of the second scale factor $S_0'$ and the time dependent instrument bias (e.g., $B_0$, $B_0'$) of the CVG 101.

Figure 2:
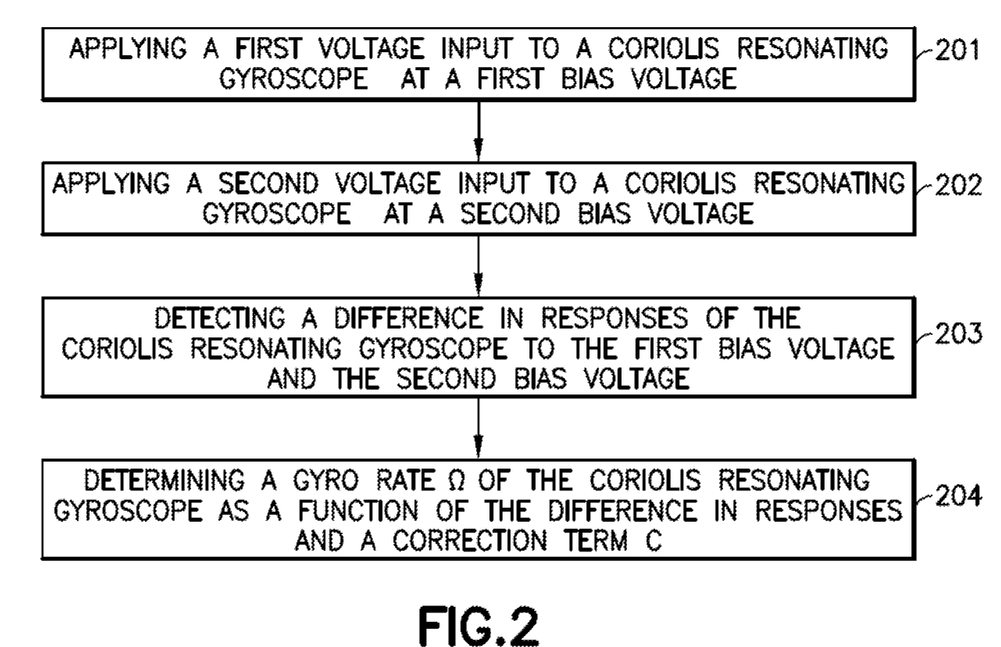
FIG. 2 is an exemplary flow diagram for computing a gyro rate of the Coriolis Vibratory Gyroscope in accordance with one or more aspects of the present disclosure.

Referring now to FIG. 2, a method for determining the gyro rate $\Omega$ is shown. At block 201, the first voltage input is applied to the CVG 101 at the first bias voltage by the voltage input supply 102. At block 202, the second voltage input is applied to the CVG 101 at the second bias voltage by the voltage input supply 102. As noted previously, the first and second voltage inputs are different from each other.

At block 203, the controller 104 (and the voltage detector 103) is configured to detect a difference in the first and second responses $V_0$, $V_0'$ of the CVG 101 to the first bias voltage $P_0$ and the second bias voltage $P_0'$. In one aspect, the difference in responses of the CVG 101 is represented as a change in voltage output of the CVG 101 from a first voltage output (e.g. the first response $V_0$) at the first bias voltage $P_0$ to a second voltage output (e.g. the second response $V_0'$) at the second bias voltage $P_0'$, which provides a first scale factor $S_0$ corresponding to the first response $V_0$ and a second scale factor $S_0'$ corresponding to the second response $V_0'$ for a common voltage input to the CVG 101. In one aspect, the difference in responses of the CVG 101 to the first bias voltage and second bias voltage is constant. At block 204, the controller is configured to determine the gyro rate $\Omega$ of the CVG 101 as a function of the difference in the first and second responses $V_0$, $V_0'$ and the correction term C using EQ1 provided above. In one aspect, the first response $V_0$ by the CVG 101 in response to the first bias voltage $P_0$ and the second response $V_0'$ in response to the second bias voltage $P_0'$ and the correction term C represents a sum of the time dependent instrument bias in response to the first response $V_0$ and the second response $V_0'$. Further, in one aspect, the gyro rate Ω is determined independently of the scale factors of the CVG 101. In one aspect, the controller 104 further determines the gyro rate of the CVG 101 as a function of the difference in the first and second responses $V_0$, $V_0'$ and the correction term C, independent of calibration of the first scale factor $S_0$ and the calibration of the second scale factor $S_0'$, where the time dependent instrument bias causes the first scale factor $S_0$ and the second scale factor $S_0'$ to shift equally.

Figure 3:
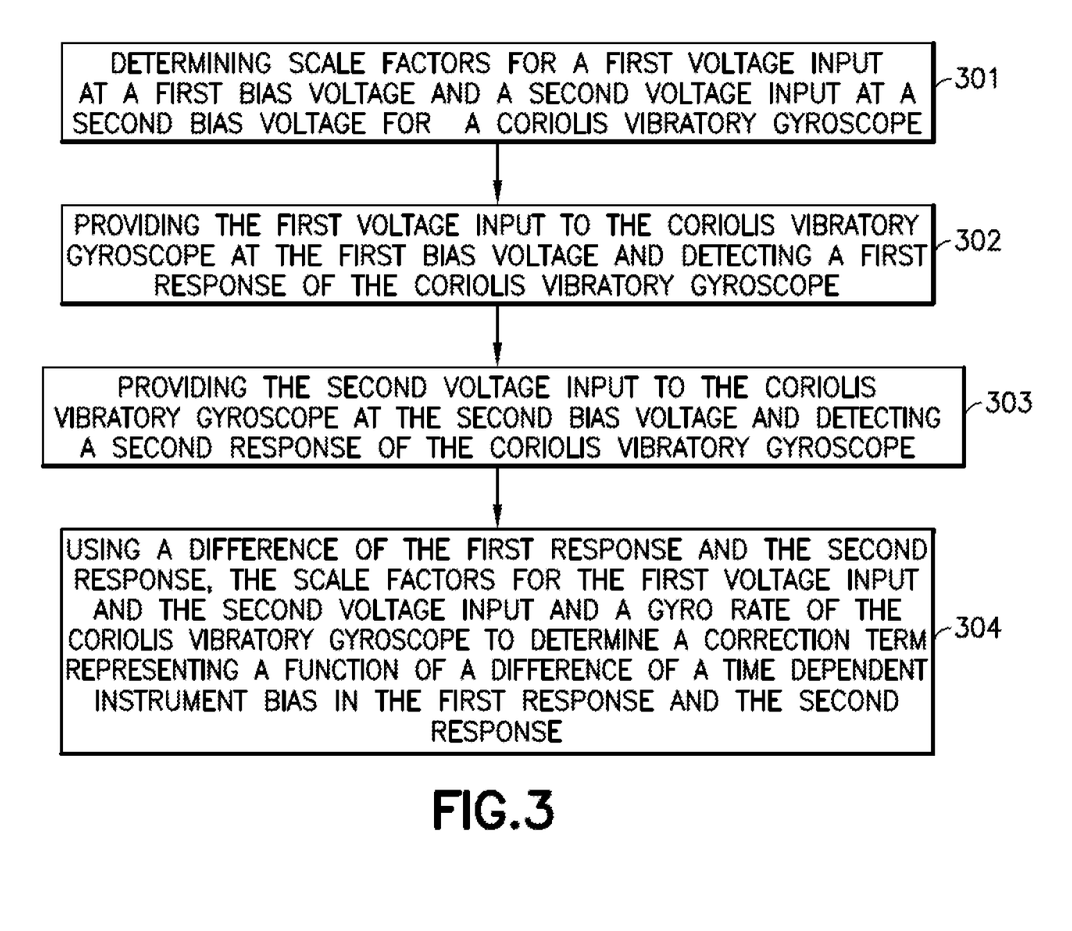
FIG. 3 is an exemplary flow diagram for computing a correction term of the Coriolis Vibratory Gyroscope in accordance with one or more aspects of the present disclosure.

Referring now to FIG. 3, a method for determining the correction term C is illustrated. At block 301, the controller 104 determines the scale factors $S_0$, $S_0'$ for a first voltage input at a first bias voltage $P_0$ and a second voltage input at a second bias voltage $P_0'$ for a CVG 101. In one aspect, this is known to the controller 104 or pre-computed. At block 302, the voltage input supply 102 provides the first voltage input to the CVG 101 at the first bias voltage $P_0$. The controller 104 and voltage detector 103 detects the first response $V_0$ of the CVG 101 in response to the first voltage input.

At block 303, the voltage input supply 102 provides the second voltage input to the CVG 101 at the second bias voltage $P_0'$. The controller 104 and voltage detector 103 detects the second response $V_0'$ of the CVG 101 in response to the second voltage input. At block 304, the controller uses a difference of the first response $V_0$ and the second response $V_0'$, the scale factors $S_0$, $S_0'$ calculated for the first voltage input and the second voltage input, the gyro rate Ω of the CVG 101 to determine the correction term C representing the function of a difference of a time dependent instrument bias in the first response and the second response. A model for computing the correction term C may be derived as follows. In one aspect, the controller 104 determines the correction term C based on EQ1 determined above. EQ1 can be rewritten into EQ8, which expresses the correction term C as:

$$C = (V_0 - V_0') - \left(\frac{1}{S_0} + \frac{1}{S_0'}\right)\Omega \qquad \text{EQ8}$$

The gyro rate Ω is determined by the controller 104 independent of the calibration of the first scale factor $S_0$ and calibration of the second scale factor $S_0'$ where the time dependent instrument bias causes the first scale factor $S_0$ and second scale factor $S_0'$ to shift equally. Because the gyro rate Ω is independent of the calibration of the first scale factor and second scale factor $S_0$, $S_0'$, the drift of the CVG 101 can be determined independently of the corrupted first scale factor and corrupted second scale factor.

Figure 4:
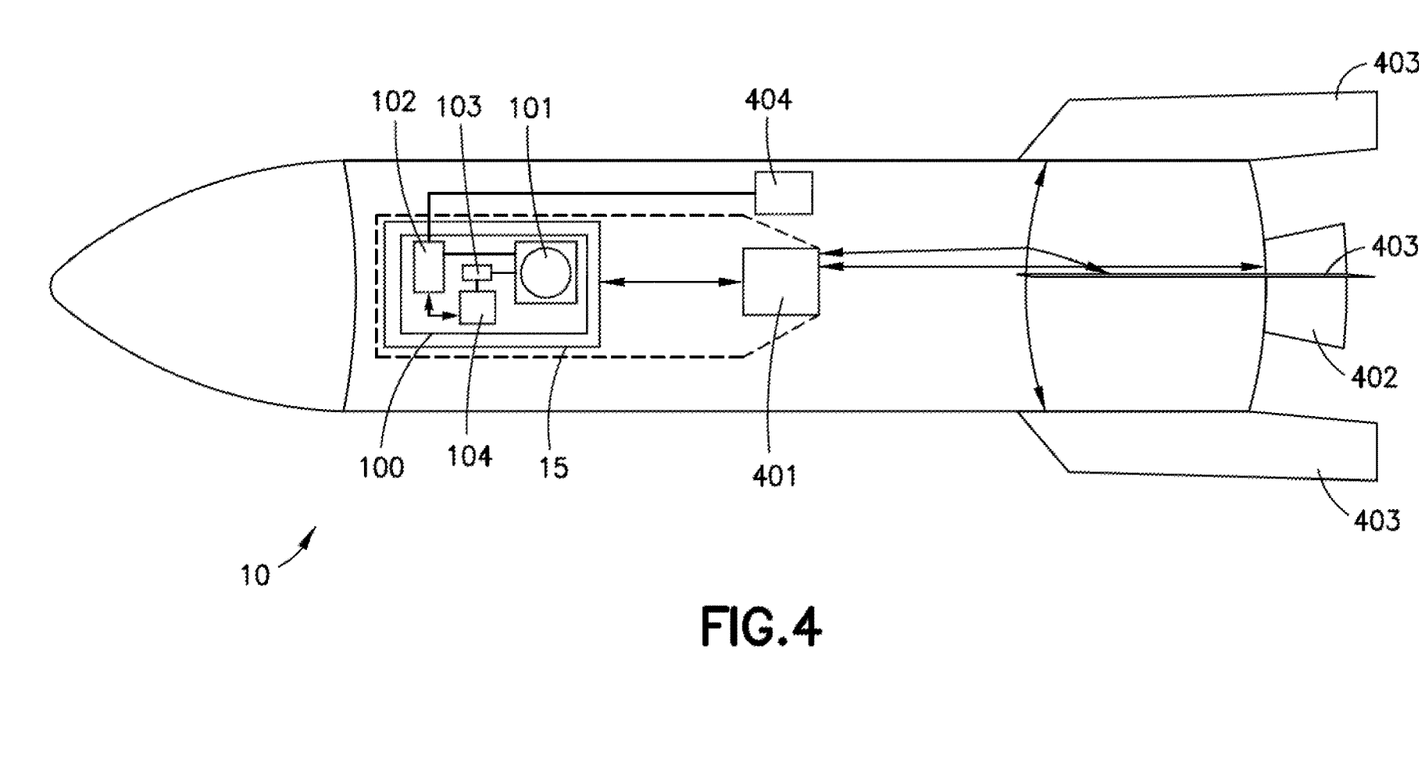
FIG. 4 is a schematic illustration of an aerospace vehicle in accordance with one or more aspects of the present disclosure.

As shown in FIGS. 1 and 4, in one aspect, the CVG system 100 is incorporated into a vehicle 10 (described in greater detail below) for guiding the vehicle 10 along a predetermined path or trajectory of travel. In one aspect, the CVG system 100 is part of a navigation system 15 of the vehicle 10. Here, the vehicle 10 is configured to use the navigation system 15 and the CVG system 100 to navigate the vehicle 10 from a first location to a second location. While the vehicle 10 is represented as an aerospace vehicle for exemplary purposes, in other aspects, the vehicle 10 may also be a maritime vehicle, an automotive vehicle, an amphibious vehicle or any other suitable vehicle. In yet other aspects, the vehicle 10 may also include consumer electronics vehicles such as remote-controlled quadcopters or autonomous or semi-autonomous vehicles such as self-driving and self-balancing vehicles. In one aspect, the navigation system 15 can be gyroscopic, but in other aspects, the navigation system 15 includes the CVG system 100 as a component of a larger navigation system (for example, global positioning system navigation systems). In one aspect, the vehicle 10, as shown in FIG. 4, also includes an aerospace vehicle controller 401, a propulsion system 402, control surfaces 403 and a power supply 404 which provides power to, for example, the voltage input supply 102 of the CVG system 100. In one aspect, the controller 104 is part of a controller for the navigation system 15 or a part of the aerospace vehicle controller 401 for the vehicle 10. In yet other aspects, the controller 104 is in communication with the controller for the navigation system 15 or the aerospace vehicle controller 401 for the vehicle 10. In one aspect, the navigation system 15 and the CVG system 100 is in communication with the aerospace vehicle controller 401, which is, in turn, in communication with the propulsion system 402 and the control surfaces 403. In one aspect, the aerospace vehicle controller 401 is configured to use feedback from the navigation system 15 and the CVG system 100 to control the operation of the propulsion system 402 and the control surfaces 403 so as to control the trajectory of the vehicle 10 in flight. In other aspects, the aerospace vehicle controller 401 is also configured to provide feedback from the control surfaces 403 and the propulsion system 402 to the navigation system 15 and the CVG system 100 during flight to provide for correction or adjustments to the course. In yet other aspects, the navigation system 15 and the CVG system 100 described herein is a part of the aerospace vehicle controller 401 (as shown in dashed lines) and is in direct communication with the propulsion system 402 and/or the control surfaces 403. In yet other aspects, the navigation system 15 and CVG system 100 is in direct communication with the propulsion system and/or the control surfaces 403. Any number of other systems may be included. The principles of the invention may be applied to other industries, including, for example, personal electronics (global positioning system receivers or smartphones).

In accordance with one or more aspects of the present disclosure the following are provided:

A1. A method comprising:
supplying a first voltage input to a Coriolis vibratory gyroscope at a first bias voltage;
supplying a second voltage input to the Coriolis vibratory gyroscope at a second bias voltage, the second bias voltage being different than the first bias voltage;
detecting a difference in responses of the Coriolis vibratory gyroscope to the first bias voltage and the second bias voltage; and
determining a gyro rate of the Coriolis vibratory gyroscope as a function of the difference in responses and a correction term.

A2. The method of claim A1, wherein the Coriolis vibratory gyroscope outputs a first response in response to the first bias voltage and a second response in response to the second bias voltage and the correction term represents a sum of the time dependent instrument bias in the first response and the second response.

A3. The method of claim A1, wherein the gyro rate of the Coriolis vibratory gyroscope is determined independent of a scale factor of the Coriolis vibratory gyroscope.

A4. The method of claim A1, wherein the correction term is a predetermined constant value based on an initial voltage output and initial input rate of the Coriolis vibratory gyroscope at the first bias voltage and the second bias voltage.

A5. The method of claim A1, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

A6. The method of claim A5, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

A7. The method of claim A6, wherein the difference in responses of the Coriolis vibratory gyroscope to the first bias voltage and the second bias voltage is constant.

A8. The method of claim A5, further comprising continuing to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

A9. The method of claim A1, further comprising navigating a vehicle from a first location to a second location with the Coriolis vibratory gyroscope.

B1. A navigation system comprising:
a Coriolis vibratory gyroscope;
a voltage input supply configured to supply a first voltage input to the Coriolis vibratory gyroscope at a first bias voltage, and
supply a second voltage input to the Coriolis vibratory gyroscope at a second bias voltage, the second bias voltage being different than the first bias voltage; and
a controller configured to detect a difference in responses of the Coriolis vibratory gyroscope to the first bias voltage and the second bias voltage, and determine a gyro rate of the Coriolis vibratory gyroscope as a function of the difference in responses and a correction term.

B2. The navigation system of claim B1, wherein the Coriolis vibratory gyroscope outputs a first response in response to the first bias voltage and a second response in response to the second bias voltage and the correction term represents a sum of the time dependent instrument bias in the first response and the second response.

B3. The navigation system of claim B1, wherein the controller is configured to determine the gyro rate of the Coriolis vibratory gyroscope independent of a scale factor of the Coriolis vibratory gyroscope.

B4. The navigation system of claim B1, wherein the correction term is a predetermined constant value based on an initial voltage output and initial input rate of the Coriolis vibratory gyroscope at the first bias voltage and the second bias voltage.

B5. The navigation system of claim B1, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

B6. The navigation system of claim B5, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

B7. The navigation system of claim B6, wherein the difference in responses of the Coriolis vibratory gyroscope to the first bias voltage and the second bias voltage is constant.

B8. The navigation system of claim B5, wherein the controller is configured to continue to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

B9. The navigation of claim B1, wherein the controller is configured to navigate a vehicle from a first location to a second location with the Coriolis vibratory gyroscope.

C1. A vehicle comprising:
a navigation system including
a Coriolis vibratory gyroscope;
a voltage input supply configured to supply a first voltage input to the Coriolis vibratory gyroscope at a first bias voltage, and
supply a second voltage input to the Coriolis vibratory gyroscope at a second bias voltage, the second bias voltage being different than the first bias voltage;
a controller configured to detect a difference in responses of the Coriolis vibratory gyroscope to the first bias voltage and the second bias voltage, and determine a gyro rate of the Coriolis vibratory gyroscope as a function of the difference in responses and a correction term.

C2. The vehicle of claim C1, wherein the Coriolis vibratory gyroscope outputs a first response in response to the first bias voltage and a second response in response to the second bias voltage and the correction term represents a sum of the time dependent instrument bias in the first response and the second response.

C3. The vehicle of claim C1, wherein the controller is configured to determine the gyro rate of the Coriolis vibratory gyroscope independent of a scale factor of the Coriolis vibratory gyroscope.

C4. The vehicle of claim C1, wherein the correction term is a predetermined constant value based on an initial voltage output and initial input rate of the Coriolis vibratory gyroscope at the first bias voltage and the second bias voltage.

C5. The vehicle of claim C1, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

C6. The vehicle of claim C5, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

C7. The vehicle of claim C6, wherein the difference in responses of the Coriolis vibratory gyroscope to the first bias voltage and the second bias voltage is constant.

C8. The vehicle of claim C5, wherein the controller is configured to continue to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

C9. The vehicle of claim C1, wherein the controller is configured to navigate the vehicle from a first location to a second location with the Coriolis vibratory gyroscope.

D1. A system comprising:
a Coriolis vibratory gyroscope;
a voltage input supply configured to supply a first voltage input to the Coriolis vibratory gyroscope at a first bias voltage, and
supply a second voltage input to the Coriolis vibratory gyroscope at a second bias voltage, the second bias voltage being different than the first bias voltage; and
a controller configured to detect a difference in responses of the Coriolis vibratory gyroscope to the first bias voltage and the second bias voltage, and determine a gyro rate of the Coriolis vibratory gyroscope as a function of the difference in responses and a correction term.

D2. The system of claim D1, wherein the Coriolis vibratory gyroscope outputs a first response in response to the first bias voltage and a second response in response to the second bias voltage and the correction term represents a sum of the time dependent instrument bias in the first response and the second response.

D3. The system of claim D1, wherein the controller is configured to determine the gyro rate of the Coriolis vibratory gyroscope independent of a scale factor of the Coriolis vibratory gyroscope.

D4. The system of claim D1, wherein the correction term is a predetermined constant value based on an initial voltage output and initial input rate of the Coriolis vibratory gyroscope at the first bias voltage and the second bias voltage.

D5. The system of claim D1, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

D6. The system of claim D5, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

D7. The system of claim D6, wherein the difference in responses of the Coriolis vibratory gyroscope to the first bias voltage and the second bias voltage is constant.

D8. The system of claim D5, wherein the controller is configured to continue to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

D9. The system of claim D1, wherein the controller is configured to navigate a vehicle from a first location to a second location with the Coriolis vibratory gyroscope.

E1. A method comprising:
determining scale factors for a first voltage input at a first bias voltage and a second voltage input at a second bias voltage for a Coriolis vibratory gyroscope;
providing the first voltage input to the Coriolis vibratory gyroscope at the first bias voltage and detecting a first response of the Coriolis vibratory gyroscope;
providing the second voltage input to the Coriolis vibratory gyroscope at the second bias voltage and detecting a second response of the Coriolis vibratory gyroscope; and
using a difference of the first response and the second response, the scale factors for the first voltage input and the second voltage input and a gyro rate of the Coriolis vibratory gyroscope to determine a correction term representing a function of a difference of the time dependent instrument bias in the first response and the second response.

E2. The method of claim E5, wherein the correction term (C) is determined from the equation $$\Omega = \frac{(V_0 - V_0' - C)}{\frac{1}{S_0} - \frac{1}{S_0'}}$$

where $S_0$ is a first scale factor corresponding to the first response and $S_0'$ is a second scale factor corresponding to the second response with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A navigation system comprising:
a Coriolis vibratory gyroscope;
a voltage input supply configured to
supply a first voltage input to the Coriolis vibratory gyroscope at a first bias voltage, and
supply a second voltage input to the Coriolis vibratory gyroscope at a second bias voltage, the second bias voltage being different than the first bias voltage; and
a controller configured to detect a difference in responses of the Coriolis vibratory gyroscope to the first bias voltage and the second bias voltage, and determine a gyro rate of the Coriolis vibratory gyroscope as a function of the difference in responses and a correction term.

2. The navigation system of claim 1, wherein the Coriolis vibratory gyroscope outputs a first response in response to the first bias voltage and a second response in response to the second bias voltage and the correction term represents a sum of the time dependent instrument bias in the first response and the second response.

3. The navigation system of claim 1, wherein the controller is configured to determine the gyro rate of the Coriolis vibratory gyroscope independent of a scale factor of the Coriolis vibratory gyroscope.

4. The navigation system of claim 1, wherein the correction term is a predetermined constant value based on an initial voltage output and initial input rate of the Coriolis vibratory gyroscope at the first bias voltage and the second bias voltage.

5. The navigation system of claim 1, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

6. The navigation system of claim 5, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

7. The navigation system of claim 6, wherein the difference in responses of the Coriolis vibratory gyroscope to the first bias voltage and the second bias voltage is constant.

8. The navigation system of claim 5, wherein the controller is configured to continue to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

9. The navigation of claim 1, wherein the controller is configured to navigate a vehicle from a first location to a second location with the Coriolis vibratory gyroscope.

10. A vehicle comprising:
a navigation system including
a Coriolis vibratory gyroscope;
a voltage input supply configured to
supply a first voltage input to the Coriolis vibratory gyroscope at a first bias voltage, and
supply a second voltage input to the Coriolis vibratory gyroscope at a second bias voltage, the second bias voltage being different than the first bias voltage;
a controller configured to detect a difference in responses of the Coriolis vibratory gyroscope to the first bias voltage and the second bias voltage, and determine a gyro rate of the Coriolis vibratory gyroscope as a function of the difference in responses and a correction term.

11. The vehicle of claim 10, wherein the Coriolis vibratory gyroscope outputs a first response in response to the first bias voltage and a second response in response to the second bias voltage and the correction term represents a sum of the time dependent instrument bias in the first response and the second response.

12. The vehicle of claim 10, wherein the controller is configured to determine the gyro rate of the Coriolis vibratory gyroscope independent of a scale factor of the Coriolis vibratory gyroscope.

13. The vehicle of claim 10, wherein the correction term is a predetermined constant value based on an initial voltage output and initial input rate of the Coriolis vibratory gyroscope at the first bias voltage and the second bias voltage.

14. The vehicle of claim 10, wherein a change in voltage output of the Coriolis vibratory gyroscope from a first response at the first bias voltage to a second response at the second bias voltage provides a first scale factor corresponding to the first response and a second scale factor corresponding to the second response for a common voltage input to the Coriolis vibratory gyroscope.

15. The vehicle of claim 14, wherein the gyro rate ($\Omega$) is determined from the equation $$\Omega = \frac{(V_0 - V_0' - C)}{\frac{1}{S_0} - \frac{1}{S_0'}}$$

where $S_0$ is the first scale factor and $S_0'$ is the second scale factor with $(1/S_0)-(1/S_0')$ being the difference in responses of the Coriolis vibratory gyroscope to the first bias voltage and the second bias voltage, $V_0$ is the first response at the first bias voltage, $V_0'$ is the second response at the second bias voltage, and C is the correction term.

16. The vehicle of claim 15, wherein the difference in responses of the Coriolis vibratory gyroscope to the first bias voltage and the second bias voltage is constant.

17. The vehicle of claim 14, wherein the controller is configured to continue to determine the gyro rate of the Coriolis vibratory gyroscope, as the function of the difference in responses and the correction term, independent of calibration of the first scale factor and calibration of the second scale factor where the time dependent instrument bias causes the first scale factor and the second scale factor to shift equally.

18. The vehicle of claim 10, wherein the controller is configured to navigate the vehicle from a first location to a second location with the Coriolis vibratory gyroscope.

19. The vehicle of claim 10, wherein the vehicle comprises one of an aerospace vehicle, a maritime vehicle, an automotive vehicle, an amphibious vehicle or any other suitable vehicle.

20. The vehicle of claim 10, wherein the vehicle comprises a consumer electronics vehicle.

* * * * *